United States Patent [19]

Krigbaum et al.

[11] 4,412,059

[45] Oct. 25, 1983

[54] HIGH MODULUS CHOLESTERIC MESOPHASE POLYMERS

[75] Inventors: William R. Krigbaum; Alberto Ciferri, both of Durham; Jack Preston, Raleigh, all of N.C.

[73] Assignee: Duke University, Durham, N.C.

[21] Appl. No.: 179,962

[22] Filed: Aug. 20, 1980

[51] Int. Cl.$^3$ .................... C08G 69/36; C08G 63/00
[52] U.S. Cl. ................... 528/192; 264/290.2; 356/403; 427/163; 428/215; 428/220; 428/910; 525/440; 525/448; 525/450; 528/288; 528/292; 528/332
[58] Field of Search ............. 264/290.2; 427/163; 428/220, 215, 910; 525/440, 448, 450; 528/192, 292, 288, 332; 356/403

[56] References Cited

U.S. PATENT DOCUMENTS

| | | | |
|---|---|---|---|
| 2,956,987 | 10/1960 | Caldwell et al. | 260/78 |
| 3,352,836 | 11/1967 | Schmitt et al. | 260/78 |
| 3,408,334 | 10/1968 | Caldwell et al. | 260/78 |
| 3,671,524 | 6/1972 | Suzuki | 544/209 |
| 3,991,016 | 11/1976 | Morgan | 260/47 |
| 4,118,372 | 10/1978 | Schaefgen | 528/192 |

OTHER PUBLICATIONS

Macromolecules 10, No. 6, Nov./Dec. 1977, pp. 1401-1406, M. Panar et al.
CA 82 140624z, 112378d, 98631x.
CA 83 164632x, 179651b.
CA 84 106246j.

Primary Examiner—V. P. Hoke
Attorney, Agent, or Firm—Oblon, Fisher, Spivak, McClelland & Maier

[57] ABSTRACT

A polymeric material which is capable of forming high modulus, biaxially orientable structures of a cholesteric mesophase, wherein said polymeric material comprises an optically active monomer which is condensation co-polymerized with at least one p-phenylene containing monomer which is itself capable of forming a polymer exhibiting a nematic mesophase, or which is capable of being copolymerized with a second monomer to form a nematic mesophase, or which is capable of being copolymerized with racemic mixture of said optically active monomers to form a nematic mesophase, wherein the resulting copolymer is characterized by a degree of inflexibility sufficient to form a mesophase and wherein said optically active monomer is present in said polymer after copolymerization in an amount sufficient to impart optical activity to said polymer sufficient to form a cholesteric mesophase.

20 Claims, No Drawings

HIGH MODULUS CHOLESTERIC MESOPHASE POLYMERS

The United States Government has rights in this invention pursuant to Government Contract No. AFOSR 79-0080, awarded by the Department of the Air Force.

BACKGROUND OF THE INVENTION

1. Field of the Invention

The present invention relates to high modulus, rigid chain polymers characterized by a capability of forming a cholesteric mesophase.

2. Description of the Prior Art

Para-linked aromatic polyamides have found commercial interest due to the fact that ultra-high-modulus fibers can be spun from their anistropic solutions. For example, poly-p-benzamide will exhibit a nematic phase when dissolved in $H_2SO_4$ or N,N-dimethyl acetamide LiCl provided that the concentration equals or exceeds certain critical values.

For instance, oriented, ultra-high modulus fibers produced from nematic polymeric materials have been described in such prior art as, U.S. Pat. No. 3,671,524 which discloses the production of an isotropic nematic aromatic polyamide from which high modulus fibers could be spun. These fibers are characterized by a quiescent nematic phase which is local in character wherein the director vector, representing the direction of molecular alignment of the crystal phase, varies randomly from one domain to the next. While these fibers can be spun to obtain a uniaxial orientation in which essentially all the director vectors are aligned along the fiber axis, thereby imparting uniaxial orientation and single direction, high strength properties, these fibers are not capable of biaxial orientation.

There is an intrinsic difficulty if one tries to prepare a sheet or film from a nematic phase and still retain the exceptional modulus properties biaxially. Any attempt to orient the nematic phase produces uniaxial orientation, and even this orientation can only be achieved in films which are fairly thin and not too wide. Theoretically, we suppose, one could try to obtain biaxial high strength properties by lamination of multiple layers of nematic polymer material one on top of the other (See, J. C. Halpin, *Polym Eng.Sci.*, 15, 132 (1975)), but in practice, it would seem that a good laminate would be quite difficult to obtain. Uniaxially oriented films are generally anisotropic with respect to such properties as strength and coefficient of thermal expansion. Thus, differences in thermal expansion between layers of a laminate would tend to preclude obtaining a durable adhesive bond. Thus, no successful laminate structure would be probable.

A cholesteric liquid crystal, or mesophase, is a twisted nematic in which the director vector, representing the average direction of long axis of the molecule in a given region, is rotated through a fixed angle upon passing from one nematic layer to the next. Low molecular weight compounds, as exemplified by certain esters of cholesterol, were known since before the turn of the century. Even cholesteric polymers are well known. No known cholesteric polymer, however, has the intrinsic molecular chain inflexibility and resistance to high temperatures to exhibit useful ultra high strength/high modulus properties. For instance poly(gamma-benzyl-L-glutamate) is a known cholesteric polymer, but it possesses a flexible helical chain configuration which is not suitable for high modulus applications. Polymers exhibiting a cholesteric mesophase have also been synthesized by placing a cholesteryl ester in the side chains. Several examples of such cholesteric polymers are described in *V. P. Shibaev, et al*, Dokl. Phys. Chem., 227, 400 (1976), *E. C. Hsu, et al*, J. Polym. Sci., Polym. Lett. Ed., 15, 545 (1977), and *H. Finkelmann, et al*, Makromol. Chem. 179, 829 (1978). In all those references, however, the main chains are flexible, and therefore do not exhibit outstanding mechanical properties. Aqueous hydroxypropyl cellulose solutions exhibiting a cholesteric phase are disclosed in *I. S. Werbowyj et al* Mol. Cryst. Liquid Cryst. Lett., 34, 97 (1976); however, the melting point of this polymer (150° C.) is too low to make it of interest for high modulus applications.

It is also known that the addition of an optically active compound to a nematogenic compound, wherein both are of low molecular weight (i.e., non polymeric), produces a mixture exhibiting a cholesteric mesophase. For example, the addition of optically active d-tartaric acid to nematogenic p-n-octyloxybenzoic acid produces a mixture which exhibits a cholesteric phase (A. D. Buckingham et al. Chem. Phys. Letters, 3, 540 (1969). Moreover, the transformation of polymeric nematic phases into cholesteric phases by the addition of an optically active compound of low molecular weight has been disclosed by M. Panar et al, Macromolecules, 10, 1401 (1977). In the Panar et al publication, for example, a cholesteric phase is produced by the addition of optically active (+)-2-methylcyclohexanone to a nematic 20% solution of poly(1,4-benzamide). In that composition, the methylcyclohexanone is not covalently bonded to the polymeric phase but is only weakly associated therewith. The use of an unbonded low molecular weight additive seems to lead to a reduction of the desired high modulus properties, and the fugitive nature of the low molecular weight reduces the ability of such a system to form a desirable high modulus sheet for film.

The prior art is replete with disclosure of generically disclosed polymers which, if properly selected could form nematic mesophases. Such polymers have also been generically disclosed to contain a comonomer, which, if properly selected, could be optically active. However, none of those prior art references seems to have used isomers from a resolved racemic mixture, or at least never recognized specifically the use of monomers with active chiral centers individually in the D- or L- form. For instance, Morgan U.S. Pat. No. 3,991,016 discloses poly(1,4-benzamide) copolymers, some of which include chiral centers. However, there is no recognition of using specifically a combination of a nematic polymer, and an optically active monomer unit. Thus, none of the prior art references contain any recognition of the possibility of creating a cholesteric mesophase. Other prior art references with similar disclosures include *Caldwell* U.S. Pat. No. 3,408,334 and U.S. Pat. No. 2,956,977, and Schmitt et al U.S. Pat. No. 3,352,836.

SUMMARY OF THE INVENTION

Accordingly, it is one object of the present invention to provide a polymer which exhibits a cholesteric mesophase.

It is an additional object of the present invention to produce a polymer which is characterzed by high modulus and which is thus capable of producing a film, sheet or fiber of ultra-high strength.

It is still a further object of the present invention to produce a synthetic polymer which can be used to prepare a biaxially oriented film or sheet having exceptional modulus and strength properties, biaxially.

It is another object of the present invention to produce a polymer which can be used to prepare a high modulus sheet or film without requiring lamination.

These and other objects as will hereinafter be recognized from the ensuing discussions have been attained by providing:

A polymeric material which is capable of forming high modulus, biaxially orientable structures of a cholesteric mesophase, wherein said polymeric material comprises an optically active monomer which is condensation co-polymerized with at least one p-phenylene containing monomer which is itself capable of forming a polymer exhibiting a nematic mesophase, or which is capable of being copolymerized with a second monomer to form a nematic mesophase, or which is capable of being copolymerized with a racemic mixture of said optically active monomers to form a nematic mesophase. The herein resulting copolymer is characterized by a degree of inflexibility sufficient to form a mesophase wherein said optically active monomer is present in said polymer after co-polymerization in amount sufficient to impart optical activity to said polymer sufficient to form a cholesteric mesophase.

DETAILED DESCRIPTION OF THE INVENTION

According to the present invention, an optically active monomer is copolymerized with at least one monomer which is capable of forming a polymer which exhibits a nematic mesophase; or is copolymerized with a sufficiently inflexible monomer whereby a polymer capable of forming a cholesteric mesophase is produced.

In order to produce a sheet or film of high modulus, the primary monomer unit present in the polymer must be quite inflexible, such as the inflexibility imparted by the presence of a p-phenylene group. In general, these polymers are optically inactive or racemic.

The optically active monomer used in this invention is preferably one which is at least a partially resolved D- or L-isomer. Upon co-polymerization with a nematic polymer, a cholesteric mesophase is formed. Of course, it has long been known that the interaction of an optically active compound with a nematic compound can transform a nematic phase into a cholesteric mesaphase. That is, in nematics, the equilibrium structure corresponds to the uniform parallel alignment of the elongated molecules. The addition of an optically active compound causes the formation of a planar, uniformly twisted crystal structure wherein the direction of the local optic axis is constant in planes that lie parallel to and turn regularly along the twist axis.

However, whereas the admixture of an optically active compound into a nematic compound is known to result in a material capable of forming a cholesteric mesophase, the reaction of the two compounds results in largely unpredictable effects. See for instance Gray, Liquid Crystals & Plastic Crystals, Vol. I page 104, Wiley and Sons Publishers (1974); also Kast, Landolt-Bornstein 6th. Edition, Springer, Berlin (1960) Vol. II, Part 2a, page 266.

As indicated above, one of the important objectives of this invention is to prepare a cholesteric forming polymeric material which exhibits high biaxial orientation and high tensile modulus in biaxial directions. Although a wide variety of cholesteric forming polymeric materials are known, the goal of preparing a cholesteric biaxially orientated and high modulus fiber, film or sheet has eluded researchers. Since a cholesteric crystal is, by definition, a twisted nematic, and since a film formed from a nematic solution is, by definition, uniaxially orientable, the concept of obtaining high modulus biaxial orientation seems to be an unattainable goal.

It has now been found however, that when an optically active monomer is co-polymerized with monomers which form nematic polymer, quite unexpectedly, just such desirable results are achieved.

Since the object of this invention is to obtain a high modulus film, sheet, or fiber having a cholesteric mesophase characteristic, it is desirable that the primary monomer unit in the polymer be highly inflexible, since highest tensile strength, will naturally tend to occur with the most inflexible polymer molecules. By "inflexible polymers" is meant a polymeric chain which requires the highest activation energies to initiate vibrational and rotational motions. In other words, the molecule is unable to fold on itself, and is limited in bending abilities.

For instance, the helical structure of poly(gamma-benzyl-L-glutamate) would be an example of a known cholesteric polymer which is highly flexible due to the presence of a helical backbone. Exemplary of highly rigid inflexible polymers, usable herein, are the aromatic polyamides, or aromatic polyesters, particularly those containing phenylene and condensed ring aromatic groups, polyhydrazides, polyazomethines, polyamidehydrazides, or the like. Especially suitable are polymers where the dominant position of the polymeric backbone is a p-phenylene group. For instance, poly-p-phenyleneterephthalamide are quite suitable.

Among suitable polyesters are hydroquinone-terephthalic acid copolymer, chlorohydroquinone terphthalic acid copolymer, or mixtures thereof. Also stilbenediol or alpha-methylstilbenediol can be copolymerized with a flexible diacid, particularly a $C_6$-$C_{14}$ diacid, such as adipic acid or methyl adipic acid, which are especially suitable.

Suitable polyhydrazides include those from terephthalic acid or acid chloride copolymerized with terephthaloyldihydrazide. Also suitable are copolymers from diamines and dihydrazides reacted with terephthaloyl chloride. Also suitable are p-aminobenzhydrazide and terephthalic acid or terephthaloyl chloride.

Also suitable is terephthalic aldehyde copolymerized with p-phenylenediamine to produce polyazomethines.

Thus, generally suitable compounds which can be subjected to condensation polymerization to obtain a nematic forming polymer used in this invention are those of the formula:

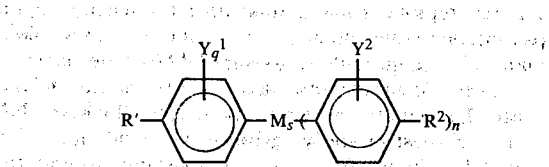

wherein $R^1$ and $R^2$ independently represent $-COX^1$, $-NH_2$, $-OH$,

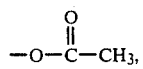

wherein $X^1$ is -OH, -Cl,

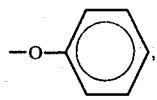

or -Br; n is 0 or 1, q is 1 to 3; wherein if n=0, M is an R' group of the R' selection above which may be the same or different and if n=1 then M is

-CH=CH-, -CH(CH₃)=CH-, -N=CH, -N=N or

$Y^1$ and $Y^2$ are independently selected from the group of -H, -Cl, -Br, lower alkyl or -OH; and s may be 0 or 1.

In other words, compounds intended to be included in the above listing are:

phenylene containing esters of the formula:

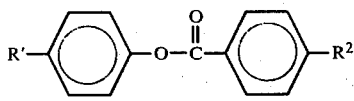

wherein $R^3$ = -Cl, -H, -CH₃ or -OH, stilbenes, such as

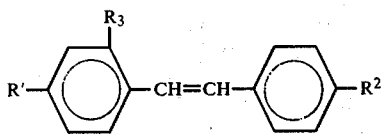

α-methyl stilbenes such as

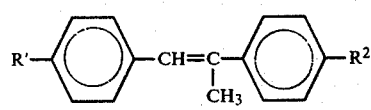

azomethines

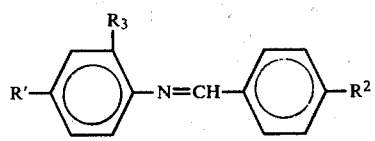

azo derivatives

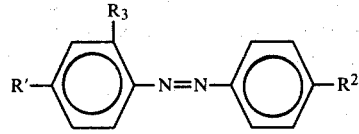

alkylene bridged diphenols of the formula

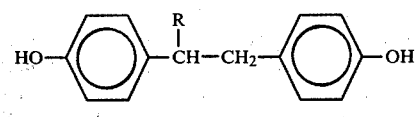

where R = H, or lower alkyl azoxy derivatives

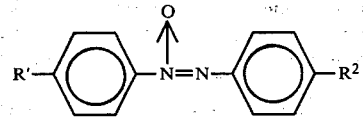

biphenyl compounds

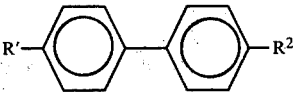

hydroquinones

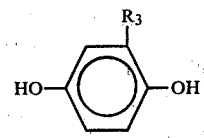

hydroquinone diacetate

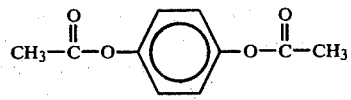

phenylene dicarboxylic acids or derivatives thereof

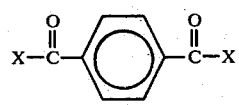

wherein X is —OH, —Cl, —Br, —O—⌬ p-benzamide

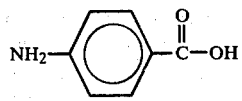

Those compounds which can be subjected to condensation polymerization by themselves to form a polymer capable of exhibiting a nematic mesophase can be used by themselves. Those compounds which are incapable by being polymerized by themselves will be co-condensed with a second monomer to form a copolymer capable of exhibiting a nematic mesophase when a second monomer is used. Suitable such second monomers would include diamines, diacids, dialdehydes, diacid halides, amino acids, diacetates, diphenols, aliphatic diols or amino alcohols. For instance, suitable diacids include:

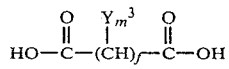

wherein $Y^3$ is lower alkyl, m is 0 or 1, f is 4–16, preferably adipic acid, sebacic acid or the corresponding acid halide or corresponding aldehyde thereof particularly adipic chloride or adipic aldehyde. Also suitable is terephthalic acid, terephthalic acid chloride or chloroterephthalic acid, 1,4-cyclohexanedicarboxylic acid or p-carboxyphenyl acetic acid.

Suitable diamines include p- or m-phenylenediamine, chlorophenylene diamine, dimethylpiperazine, methyl hexamethylediamine, methyl piperazine or amino benzyl amine.

Suitable amino acids include, phenylalanine, histadine, p-amino benzoic acid or p-amino phenyl propanoic acid.

Suitable amino alcohols include ethanol amine, propanolamine, 1,4-aminobutanol.

Suitable dialdehydes include glyoxal, terephthalaldehyde, and chloroterephthalaldehyde. Suitable diphenols include 4,4′-dihydroxy-alpha-methylstilbene, 1,2-di-p-hydroxyphenylpropane. Diolmonomers include hydroquinone and chlorohydroquinone.

Of course, the particular selection of compounds subjected to condensation polymerization will depend upon the particular intended end product. Thus, if a polyester is intended to be formed, a suitable diacid and dialcohol will be selected. If a polyamide is intended, suitable diacids and diamines or amino acids will be used. The above listing is not intended to imply that all possible permutations or combinations of condensation polymers have been produced, but is merely to illustrate the scope of polymeric material which can be used in the present invention. Critical limiting factors on the above listing is that the polymer selected must be capable of forming a nematic mesophase either by itself, or when admixed in an appropriate solvent, and the resulting chain must be highly inflexible, sufficient to insure that either a lyotropic or thermotropic nematic or cholosteric will be capable of being formed.

Just about any polymer which is capable of producing a nematic mesophase, that is one which is highly inflexible, because of a high degree of stiffness, can be used in the present invention.

The polymer may also contain small amounts of one or more comonomers. For instance, when the polymer contains a predominant p-phenylene backbone, a second comonomer, used in an amount of up to 10%, which contains a meta-phenylene group, could be satisfactory. The comonomer may also be one which contains chiral centers, but which can be used either in the form of a racemic mixture, or in the form of the fully resolved, optically active isomer. An example of such a monomer would be methyladipic acid.

The particular selection of comonomers to form the nematic polymer will depend on whether the sheet or film is intended to be formed from a solution or a melt. If the film is to be formed from a solution, the polymer must be more stiff to produce a nematic mesophase, and therefore, the use of comonomers which would tend to increase the flexibility of the resulting polymer would be discouraged. Conversely, if the film or sheet is to be formed from a melt, a larger amount of generally flexible comonomer can be tolerated.

The optically active monomer to be copolymerized with the monomer forming a nematic polymer may be either an isomer from a resolved DL racemic mixture, or a monomer capable of existing only in an optically active state. The optically active monomer may be used with its racemic mixture so long as sufficient resolved optically active monomer is present to impart optical activity to the polymer. Thus, the purpose of the optically active monomer is to impart sufficient chiral groups to the final polymer product, such that the polymer will be optically active. The number of optically active monomers per macromolecule chain is not critical. The main effect of increasing the number of optically active sites per polymer chain is to decrease the helical pitch of the nematic planes within the cholesteric mesophase. It is this helical twisting of the nematic planes, which exhibits high modulus in one direction because of the highly inflexible and highly oriented macromolecules, that gives exceptional biaxial modulus properties and which allows polymers of the type disclosed in this invention to be used in forming sheets or films of high strength and/or high modulus. Generally amounts of from 1 to 15 weight percent of optically active monomer, based on the total polymer in composition, will be sufficient for this purpose. However, the quantity of optically active monomers used is also a function of the degree of optical activity of that monomer. Thus, less of a very optically active monomer will give essentially the same optical effect of a greater amount of lesser optically active monomers. More highly optically active monomers are preferred since the less such monomer used, the greater the degree of inflexibility of the final product and thus the higher the modulus. Of course, since a cholesteric mesophase is basically a twisted nematic mesophase formed by the introduction of an optically active compound into the nematic compound, the invention of the use of the optically active monomer in the present invention is to convert the nematic crystal structure, which would otherwise be formed into a cholesteric mesophase. What is most surprising about the present discovery is that the required number of chiral centers which must be introduced into the high modulus nematic polymer to be sufficient to impart cholesteric mesophase capabilities, is sufficiently small as not to interfere with the high modulus. If too large an addition of optical monomers were required one might have expected them to cause a marked lowering of the modulus, or a reduction in the ability of the nematic to form a cholesteric mesophase. Moreover, the cholesteric mesophase forming ability may have been expected to have been dependent upon the binding constant of the additive and the polymer, as discussed above M. Panar et al, supra. Interestingly, it is found that the nematic polymer can tolerate a limited degree of irregularity along the chain without losing their high modulus properties, and the covalent bonding of the nematic with the optically active compound, still enables the formation of a cholesteric transformation. In a polymeric structure a multiplicity of optically active monomer units may enter the chain. One might not reasonably predict that the chiral centers of the various optically active individual monomer units would line up in a sufficiently regular manner to enable the formation of a cholesteric mesophase. One could have as easily expected the formation of a modified nematic phase wherein the twist of crystal structure is of a harmonic or otherwise non-cholesteric rotation. Moreover, it was completely unpredictable that a film or sheet formed from from such a material could be biaxially oriented, or that the biaxially oriented film will provide high tensile modulus properties biaxially.

Suitable optically active monomers include amino acids such as D- or L-alanine, -valine, -lucine, -isolucine, -methinine, -phenylalanine, -histadine or -2-(p-aminophenyl)propanoic acid particularly when the nematic polymer is a polyamide, polyamide-hydrazide or polyhydrazide.

Also useable are the diacids, such as (+)-3-methyladipic acid, or the corresponding $C_6$-$C_{14}$ diacids; 4-carboxyphenylacetic acid; methyl homoterephthalic acid. Diamines can also be used, such as (+)-2-methyl piperazine, (+)-2-5 dimethyl piperzine, (+)-3-methyl-hexamethylenediamine, D- or L-p-aminomethyl benzyl amine. Especially suitable optically active monomers include L-valine, and

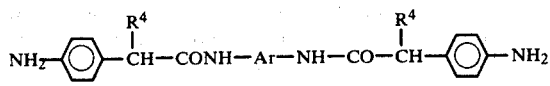

wherein $R_4$ is a lower alkyl and Ar is a phenylene or alkyl substituted phenylene or

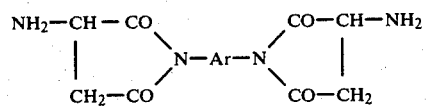

Useful diphenols that are optically active include alkylenebridged diphenols such as (+)-1,2,di-p-hydroxyphenylpropane.

Also useable are the optically active biphenyls which contain an asymmetric carbon atom by virtue of the presence of groups which hinder rotation of the phenyl rings.

The actual quantity of optically active monomer to be introduced into the nematic polymer is determined by the number of chiral centers needed to cause the nematic polymer to become optically active. When sufficient optical activity has been introduced into the nematic, a transformation to a cholesteric mesophase will occur.

It will be apparent that the nematic forming polymers described herein are those prepared by condensation polymerization. The polymerization reaction can occur by any of the methods conventional in the art. For instance, the monomer producing the nematic forming polymer may be first prepared so as to leave functional end groups which are reactive with the optically active monomer. Thus, the nematic polymer can be formed leaving terminal alcohol, carboxy, or amino groups which are reactable with functional groups on the optically active monomer. Alternatively, the reactive sites can be provided in side chains of a nematic polymer so that the optically active monomer will be located on innumerable side chains on the extended polymer. It is also possible to copolymerize the nematic forming monomer with the optically active monomer to directly form the cholesteric copolymer wherein the chiral centers, imparting optical activity to the polymer, will appear throughout the polymeric main chain. It is also possible to react a phenylene containing monomer which is not homopolymerizable to form a nematic polymer, with an optically active monomer so as to directly form a cholesteric polymer.

The monomer can be polymerized to degrees of 20–2000 preferably 30–150. If the molecular weight of the polymer is too large, the viscosity of the solution of the polymer will be too high and film forming or sheet forming will be impractical. If melt sheet forming techniques are used, the molecular weight of the produced polymer should not be too high, lest the melt viscosity be too high.

Catalysts usable in producing the polymers are the conventional ones ordinarily usable with such reactions. For instance, pyridine is used in the reaction of p-aminobenzoic acid with triphenylphosphite to yield poly-p-benzamide. In the preparation of aromatic polyesters from diacids and bisacetates of diphenols, suitable basic catalyts are sodium acetate, sodium hydroxide, or sodium phosphate.

Solvents usable in providing the polymers are also those conventionally used. Thus, for the preparation of aromatic polyamides, polyamide-hydrazides and polyhydrazides such solvents as N,N-diamethylacetamide, N-methylpyrrolidone, hexamethylphosphoric-triamide or suitable mixtures of such solvents may be used alone or in combination with dissolved salts such as lithium or calcium chloride or bromide. Inert, high boiling compounds, such as decaline and xylene are useful in the preparation of polyazomethines and certain polyesters.

The resulting polymer material of this invention is then formed into a fiber, sheet or film by conventional techniques. For instance, the material can be dissolved in a suitable solvent, such as any of those above or sulfuric acid (particularly for the polyamides, polyhydrazides or polyamide-hydrazides) to produce a spinning solution which is then spun into a film or fiber. Alternatively, the polymeric material can be heated to its melt temperature, and then spun into a sheet or film using conventional techniques. It is also possible to use a solution or melt of the polymeric material to cast a film or sheet, such as by the use of a Doctor Blade, or to use the polymeric material directly in a molding operation.

The resulting film or sheet can be biaxially oriented directed during formation, as is conventional with biaxial orientable film or sheet, such as forcing the polymer through a narrow slit and simultaneously pulling the sheet or film, or by subjecting the sheet or film to biaxial stress.

These cholesteric materials produced herein are useful high strength, high biaxial modulus and biaxially orientable structural material, or protective material which will find applications in such high stress environments as in aerospace structures. These polymers are capable of producing high modulus fibers wherein the initial modulus is in the order of 300–1200 gm/denier and high tensile strengths of 9–40 gm/denier, film can be produced having a modulus of $1–5 \times 10^6$ lbs./in$^2$ Very good results have been attained by forming a copolymer of p-aminobenzoic acid and L-valine, of the form

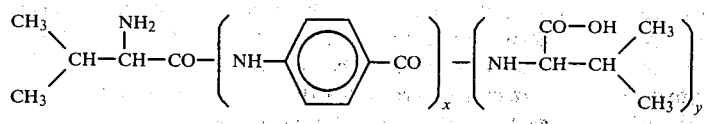

wherein
x=32–98
y=0 to 1

Very good results are also attainable by reacting

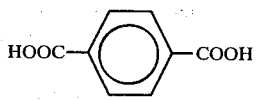

with an amino acid such as L-valine chloride to form

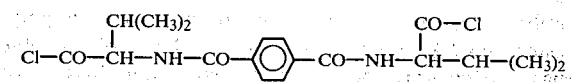

which is then reacted with p-phenylediamine to yield a regularly alternating copolymer containing a large number of optically active sites.

Copolymers produced from p-phenylediamine and mixtures of the above dicarboxylic acid + L-valine with terephthaloyl chloride provides stiff, rod-like polymers which are suitable for spinning to ultra-high strength/high modulus fibers.

APPLICATIONS

A polymer of the type described herein can be rigidified by transformation to a glass (cooling below the glass transition temperature) or by crystallization (change of temperature or solvent/nonsolvent composition). Crystallization is the preferred procedure for high modulus applications. Due to the long relaxation times which are a general characteristic of polymeric liquids, but not of low molecular weight liquids, the organization of molecules in the cholesteric phase can be retained in the rigidified polymers. Several cholesteric textures are known, and each of these would give a rigidified product having different mechanical and optical properties. For example, in a sheet or film of a cholesteric phase having the Grandjean texture, the preferred alignment of the helical axes is perpendicular to the plane of the sheet or film. Crystallization of this texture will produce a crystallite orientation having a high degree of planar texture (preferred molecular alignment in the plane of the sheet or film), balanced properties (equal tensile properties in every direction in the plane of the sheet or film), and the highest tensile modulus which can be achieved for the given polymer in the form having balanced properties.

The foregoing has been concerned with solidification of a cholesteric mesophase having Grandjean texture. A more complex distribution of mechanical properties can be achieved by subjecting the cholesteric polymeric phase to an external field (electric, magnetic, or hydrodynamic) prior to solidification. For example, the shear rate varies radially during flow through a capillary or spinneret. Fibers could be prepared having a sheath-core structure with a parallel (nematic) alignment of molecules in the core and a helicoidal distribution in the outer sheath. Application of a magnetic field may produce a transition from a cholesteric to a nematic (untwisted) structure. Hence, local application of a magnetic field can yield a film with controlled layers or regions of a nematic and cholesteric ordering to produce a desired arrangement of mechanical and optical properties. Various patterns of flow instabilities, involving the tilt and orientation of the helical axes, are produced by the application of an electric field to a cholesteric phase. The cholesteric polymers described herein would allow these flow-patterns to be frozen into a solid product.

A second broad category of applications utilizes the combination of structural integrity imparted by the polymer and the unique optical properties of the cholesteric arrangement of the component molecules. The helical pitch, $P$, and the wavelength $\lambda_o$ of maximum absorption, of the polymeric cholesteric mesophase can be controlled by selecting chiral monomers having different optical activity, and by varying the mole percent of the chiral monomer or monomers. The cholesteric mesophase will be colored if $\lambda_o$ falls in the range of visible wavelengths due to selective reflection. Since $P$ and $\lambda_o$ vary with temperature, cholesteric mesophases have been used for temperature sensing and thermal mapping. In order to give low molecular weight cholesteric liquid phases structural integrity, these have been encapsulated and coated on a polymeric film. The polymers described herein would eliminate the need for these steps. Alternatively, U.S. Pat. No. 3,789,225 (C. B. Leder, 1974, assigned to du Pont) discloses a low molecular weight cholesteric liquid crystal which exists as a glass at ambient temperature. The mechanical properties of such a low molecular weight glass would be inferior to those of a polymeric film or sheet having comparable dimensions. As described above, the cholesteric ordering in a polymeric cholesteric phase can be retained after rigidification by formation of a glass, or by crystallization. So long as any inhomogeneities are smaller than the wavelength of light, the solid material should exhibit the optical properties characteristic of the cholesteric phase. The helical pitch will be that which existed at the particular temperature at which solidification occurred. In addition to the variables mentioned above, the helical pitch can also be altered by varying the cooling rate used in solidification, which allows a single cholesteric polymer to be produced in a range of colors, depending upon the cooling rate employed. The cholesteric polymers described herein have the advantages of superior tensile properties and permanence (since the cholesteric structure is here an inherent property of the polymer itself). A variety of shapes can easily be fabricated, and the necessity to encapsulate or coat a base polymer film is avoided.

Specific examples illustrating these applications are the following:

1. Sheets or films which, due to solidification of a polymeric cholesteric phase having Grandjean texture, possess a unique combination of high tensile properties in all directions in the film plane (balanced properties) and low weight.

2. Textile fibers which, due to a unique crystallite orientation distribution conferred by spinning the described polymers from a cholesteric melt or a cholesteric solution phase, combine good tensile properties with resistance to buckling when bent.

3. Polymeric textile fibers having a sheath-core structure, with a predominance of nematic type parallel ordering of the crystallites in the core, and a helicoidal arrangement of crystallites in the sheath.

4. Polymeric sheets or films having controlled variations in crystallite orientation due to the application of an external magnetic or electric field to the cholesteric phase prior to solidification.

5. A polymeric sheet, film, or fiber which, due to the cholesteric arrangement of its component molecules, selectively reflects circularly polarized light at wavelength $\lambda_o$ 6. A polymeric sheet, film, or fiber as described in example 5, but with $\lambda_o$ in the visible wavelength region to produce a colored material without the use of pigments or dyes.

7. A composite polymeric film to be composed of three layers, the outer two having a cholesteric arrangement of the molecules with pitch P and absorption maximum $\lambda_o$, but of opposite hand, and the central layer having a planar nematic (parallel) alignment of molecules and thickness $\lambda_o/2$, the entire composite selectively reflecting all incident radiation of wavelength $\lambda_o$ in the form of circularly polarized light.

8. The three layered composite polymeric film described above, but with $\lambda_o$ selected in the visible wavelength to produce a sheet or film having a more deeply colored hue than example 6, and again without the need for added pigments or dyes.

9. The use of sheets or films fabricated as described in example 1 for high strength/low weight applications, as in aircraft skin and structural members, automobile body panels and fenders, for mobile homes, polymeric parts fabricated by molding, and packaging films.

10. The use of polymeric sheets or films as described in example 6 and 8 for the high strength/low weight applications cited in example 7, with the additional objective of imparting a color of controlled hue without the addition of dyes and pigments.

11. The use of polymeric materials as described in examples 6 and 8 to fabricate pipes, furniture, or toys where a combination of strength and controlled hue without added pigment or dye is desired.

12. The use of polymeric sheets or films as described in examples 6 and 8 to fabricate decorative moldings, earrings, and jewelry. The hue observed will change with the angle of view, trending toward the blue end of the spectrum as the viewing angle departs from the perpendicular.

13. The use of polymeric sheets, films, or fibers as described in example 6 for temperature sensors and thermal mapping applications.

14. The use of polymeric sheets or films as described in example 8 for temperature sensors and thermal mapping applications.

15. The use of deeply colored thin films as described in examples 6 or 8, either with an adhesive backing or attached to a sheet of paper or plastic having an adhesive backing, to produce decorative effects by attachment to any flat surface.

The materials herein described are polymers capable of exhibiting either a lyotropic or a thermotropic cholesteric phase. In some instances the same material may exhibit both lyotropic and themotropic cholesteric phases. The fact that a material is polymeric may be confirmed in the customary manner by mesurement of the molecular weight by an absolute method, such as light scattering or sedimentation. Alternatively, a relative method, such as the intrinsic viscosity, may suffice. The existence of a polymeric cholesteric phase may be demonstrated by the conventional methods developed to confirm cholesteric phases in low molecular weight materials. These generally involve unique optical properties arising from the chiral structure of the cholesteric phase, over and above those due to the chirality of the individual molecules. The former are termed extrinsic properties and the latter intrinsic.

1. The extrinsic optical rotation for visible light, as measured by the optical rotaty dispersion (ORD) spectrum, ranges from $10^3$ to $10^5$ degree/mm. for cholesteric phases, as compared with intrinsic rotations of $10^{-2}$ to $10^2$ degree/mm. for normal optically active liquids.

2. The circular dichroism (CD) spectrum indicates a difference in the absorption of right-handed and left-handed circularly polarized light. An extremum (maximum or minimum) appears in this spectrum at a wavelength $\lambda_o$ due to the complete reflection of circularly polarized light of one hand at this wavelength. This wavelength is related to the cholesteric pitch P by the equation $\lambda_o = nP$, where n is the mean refractive index of the cholesteric phase. The absorption spectrum also exhibits a peak at $\lambda_o$ for the same reason.

3. An achiral solute having an absorption maximum at wavelength $\lambda'$ can be caused to exhibit an induced circular dichroism (ICD) extremum at $\lambda'$ due to absorption of the achiral solute onto the ordered molecules in a cholesteric mesophase.

4. Total or partial ordering of a thin sample of the cholesteric phase with the helix axes in the plane of the sample (focal conic texture) produces, in the oriented regions, a series of equidistant lines or curves which can be observed under the microscope. The spacing, d, between lines in this characteristic "fingerprint" pattern is $d = P/2$. This pattern will only be visible if the pitch exceeds $10^4$ Angstroms.

Having generally described the invention, a more complete understanding can be obtained by reference to certain specific examples, which are provided herein for purposes of illustration only and are not intended to be limiting unless otherwise specified. EXAMPLE I The following example illustrates the preparation of a rod-like aromatic polyamide of the AB type which is modified by the addition of an optically active monomer. The latter may appear randomly in the copolymer and/or as an end-group in the amino acid monomer.

A copolymer of p-aminobenzoic acid (PABA) and L-valine, (co-PBA/Val), was prepared via the Yamazaki reaction by disolving 2.0 g (0.015 mole) of p-aminobenzoic and 0.051 g ($4.38 \times 10^{-4}$ mole) of L-valine in a mixture of 10 ml pyridine as catalyst and 18 ml of N-methylpyrrolidone (NMP) solvent containing 1.12 g of LiCl polymer solubility enhancer. To this reaction mixture was added 4.67 g (0.015 mole) of triphenyl phosphite, and the reaction was carried out at 80° C. for 5 hr. The resulting copolymer, containing 3 mole % of L-valine, was precipitated, washed three times in a blender with $CH_3OH$, once with $CHCl_3$, and dried under vacuum at 60° C. for 2 days.

The copolymer is soluble in concentrated $H_2SO_4$ and in dimethylacetamide (DMAc) containing 3% LiCl.

The inherent viscosity of the copolymer at 30° C. in H₂SO₄ at c=0.504 g/dl was 1.48 dl/g.

Solutions in anhydrous DMAc with 3.12% LiCl up to a concentration of 6.3% polymer appear to be isotropic under the polarizing microscope and show only a small negative optical rotation in the visible and ultraviolet down to 330 nm. The critical polymer concentration, as determined by observing the appearance of the anistropic phase with a polarizing microscope, was 6.5% for the anhydrous solvent.

The anistropic phase of co-(PBA/Val) in anhydrous LiCl containing 3.12% LiCl exhibits an extremely large negative optical rotation below 400 nm. The corresponding circular dichromism (CD) curve has a strong negative extremum at 356 nm. Selective reflection of circularly polarized light is a unique characteristic of cholesteric phases, and this gives rise to the strong CD effect. The sign and wavelength of the extremum is related to the handedness and pitch of the cholesteric helix. We can conclude that the helix is left-handed, since the negative CD extremum indicates that right-handed circularly polarized light is reflected. The pitch P of the helix can be calculated from the de Vries' formula:

$$\lambda = nP$$

where $\lambda = 356$ nm is the wavelength corresponding to a maximum reflextivity and $n = 1.46$ is the refractive index of the solution. Application of this relation yields $P = 244$. Stronger evidence for the existence of the helical arrangement of molecules expected for a cholesteric phase, is provided by the induced CD effect using an achiral dye. The induced circular dichromism effect is well known for dyes with cholesteric phases of low-molecular-weight material. Optical activity of the dye molecules is induced by their absorption which forces them to adopt the helical arrangement of the cholesteric phase. We dissolved an achrial dye, 1,1'-diethyl-2,2'-cyanine iodide, in 6.75% solution of co-(PBA/Val) in anhydrous DMAc containing 3.12% LiCl. The absorption bands of the dye lie in the visible spectrum, and are well separated from any strong absorption band of the polymer. The CD specimen has two extrema corresponding to the visible absorption bands of the dye. This indicates that the absorbed dye molecules have taken on a helical arrangement and provides clear evidence that the copolyamide has formed a cholesteric phase.

A film obtained by solvent evaporation of an anistropic solution of the polymer gave a photomicrograph showing the typical fingerprint pattern of a cholesteric phase.

EXAMPLE II

The following example illustrates that the copolymer of Example I can be made using instead of p-aminobenzoic acid the corresponding "dimer". The copolymer obtained is higher in molecular weight than the copolymer of Example I. The "dimer" is produced by the reaction of p-nitrobenzyl chloride with p-nitrobenzoic acid followed by reduction; the m.p. of the dimer is >350° C.

A mixture of 4'-amino benzoyol-N-4-aminobenzoic acid (2.56 gms. 0.01 mole) and L-valine (0.0336 gms., 0.003 moles) was dissolved in a mixed solvent of NMP (60 ml) containing 4% LiCl and 10 ml. pyridine at 100° with stirring under nitrogen. To this was added triphenyl phosphite (3.42 gms, 0.011 mole). The reaction was continued for 6 hours after which time the reaction mixture was poured into a food blender jar containing ethanol and was chopped. A fibrous mass was formed in the blender jar.

The chopped polymer was filtered, washed well with ethanol and dried thoroughly under vacuum; the inherent viscosity of the copolymer was 1.68.

EXAMPLE III

The following example illustrates a method of incorporating L-valine into the main chain by means of a monomer containing the L-valine moiety; the functional groups of this monomer are of the type which react readily in the Yamazaki reaction for the preparing of aromatic polyamides. (The monomer was prepared by the reaction of p-nitrobenzoyl chloride with L-valine followed by reduction.)

A mixture of PABA (2.74 gms, 0.02 mole) and 4-amino-benzoyl-L-Valine (0.141 gms, 0.0006 mole) was dissolved in a mixed solvent of NMP (40 ml) containing 4% LiCl and 10 ml pyridine at 100° C. with stirring under nitrogen. To this was then added triphenyl phosphite (6.84 gms, 0.022 mole). The reaction was continued for 6 hours, after which time the reaction mixture was poured into ethanol in the blender jar and chopped. The chopped polymer was filtered, washed well with ethanol and dried under vacuum at 90° C.; the inherent viscosity of the copolymer was 1.5.

EXAMPLE IV

The following example illustrates that the optically active monomer may be copolymerized with p-aminobenzoic acid under conditions which favor the formation of a random copolymer. This is undoubtedly the case because aliphatic diacids have been shown by Yamazaki to be even more reactive with aromatic amino groups than aromatic diacids.

A mixture of PABA (2.74 gms., 0.02 moles) and 3-(+)-methyladipic acid (0.032 gms, 0.0002 moles) was dissolved in a mixed solvent of NMP (40 ml) containing LiCl (2 gms, 4 wt%) and 10 ml pyridine at 100° C., with stirring under nitrogen. To this was then added triphenyl phosphite (6.84 gms., 0.022 moles). The reaction was continued for 6 hrs. after which time the reaction mixture was poured into ethanol in the blender jar and chopped. The precipitated polymer was filtered, washed well with ethanol and dried under vacuum at 90° for 18 hrs.; the inherent viscosity of the copolymer was 1.48.

EXAMPLE V

The following example illustrates a method of incorporating an optically active diacid in a monomer which can be copolymerized readily. (The monomer m.p. >350° C., was prepared by the reaction of (+)-3-methyladipic acid chloride and p-aminobenzoic acid.)

A mixture of PABA (2.74 gms, 0.02 moles) and N,N'-(p-carboxy phenyl) bis-3(+) methyl adipamide (0.0796 gms., 0.0002 moles) was dissolved in a mixed solvent of NMP (40 ml) containing 4% LiCl and 10 ml pyridine at 100° C. with stirring under nitrogen. To this was added triphenyl phosphite (6.84 gms, 0.022 mole). The reaction was continued for 6 hours after which time the reaction mixture was poured into ethanol in the blender jar and was chopped. The precipitated polymer was filtered, washed well with ethanol and dried under vacuum at 90°; the inherent viscosity of the copolymer was 1.45.

EXAMPLE VI

This example illustrates that the copolymers of Example IV can be made in higher molecular weight by use of the "dimer" monomer; also, the fibers prepared from its copolymer were unusually strong and tough.

A mixture of 4'-aminobenzoyl-N-4-aminobenzoic acid (2.56 gms., 0.01 mole) and 3-(+)-methyladipic acid (0.0024 gms., 0.0015 mole) was dissolved in a mixed solvent of NMP (60 ml) containing 4% LiCl and 15 ml pyridine at 100° C., with stirring under nitrogen. To this was then added triphenyl phosphite (3.42 gms, 0.011 mole). The reaction was carried out for 6 hrs. after which time the very viscous reaction mass was poured into the blender jar containing ethanol and was chopped. During the pouring of the reaction mixture into the blender jar, fibers were observed to be formed. Examination of these fibers showed them to be extraordinarily strong and tough.

The chopped polymer was filtered, washed well with ethanol, dried in vacuum at 90° for 18 hrs., inherent viscosity of the copolymer was 1.68.

In all of the examples above (I-VI), the rod-like polymer was poly-p-benzamide (BPA) which was copolymerized with (and possibly by end-capped by) minor amounts of an otically active comonomer. The following example illustrates the preparation of a co-polymer of PBA and the polyterephthalamide of p-aminobenzhydrazide (PABH-T). The copolymer is readily modified with an optically active diacid because such a monomer can readily be substituted for a portion of the terephthalic acid used in making the copolymer.

EXAMPLE VII 2.05 gms. (0.015 mole) of PABA was dissolved in a mixed solvent of 30 ml NMP containing 4% LiCl and 7.5 ml pyridine at 100° C. in nitrogen. To this was added 5.1 gms. (0.018 mole) of triphenyl phosphite. After 2.5 hrs., when a highly viscous solution was formed, 25 ml of NMP with 4% LiCl and 6 ml of pyridine were added to reduce the viscosity. To this mixture was then added 0375 gms. (0.0025 mole) of p-aminobenzoyl hydrazide and 0.322 gms. (0.002 moles) of terephthalic acid plus 0.08 gms. (0.0005 mole) of 3-(+)-methyl adipic acid. The reaction temperature was raised to 120° C. The viscosity of the mixture was restored again after 3 hrs. The reaction was further continued for 1 hour, after which the reaction mixture was poured into a blender jar containing ethanol and was chopped.

The high molecular weight polymer was washed well with ethanol and dried well under vacuum.

All of the foregoing examples have been concerned with the preparation of rod-like aromatic polyamides containing minor amounts of an optically active comonomer. Because of the very high melting points of the polymers of the preceding examples, the polymers were prepared in solution and useful articles e.g., fibers and films, of necessity had to be fabricated from solution. The following examples illustrate the preparation of polyesters which can be prepared by low temperature polycondensation, e.g., interfacially or in a melt. Useful articles can be formed from these polymers either from solution or from a melt. (Films are most readily cast from solution whereas fibers are more conveniently obtained from a melt.)

EXAMPLE VIII

A solution of 4,4-dihydroxy-α-methyl stilbene (5.6952 gms., 0.0252 moles) and sodium hydroxide (2.016 gms. 0.0504 moles) in 150 ml of ice cold water was prepared in a home food blender. A solution of 1 gm. of Dupanol ME (sodium lauryl sulfate) in 10 ml of was added to the slowly stirred aqueous solution in the blender jar. Then 3-(+)-methyl adipic acid chloride (4.974 gms., 0.0252 mole) in 75 ml of 1,2-dichloroethane was added rapidly with vigorous stirring. The stirring was continued for 5 minutes and 250 ml of hexane was added to precipitate the polymer, which was then filtered, washed with water, ethanol water mixture, and dried under vacuum at 60° C.

Fibers were pulled from a melt of the polymer (m.p. ~130° C.) and these were found to be strong and tough.

In addition to preparation of the above polymer by the interfacial method, it can be prepared in a melt by reaction of the bis-acetate of the diol monomer and (+)-3-methyladipic acid using a basic catalyst, such as sodium acetate or phosphate. Copolymers also can be prepared readily by using, in addition to the optically active diacid, a diacid such as adipic, sebacic or the like.

The following examples illustrate how a preformed polymer, Eastman's T2/60 (prepared from terephthalic acid, ethyleneglycol and p-hydroxybenzoic acid), can be modified by the addition of an optically active monomer.

EXAMPLE IX (a) Preparation of polyethyleneterephthalate-3-(+)-methyl adipate copolymer.

A mixdture of polyethyleneterephthalate prepolymer (oligiomer) (5.4 gms.), antimony oxide (0.0002 gms.) catalyst and 3-(+)-methyladipic (0.6 gms.) acid was placed in a polycondensation tube having an inlet and outlet for nitrogen. The mixture was then heated in a nitrogen atmosphere at 280° using a triethylene glycol vapor bath. After a low melt viscosity was obtained (3 hrs.) a vacuum of 0.5 mm. was applied for 1 hour.

The polymer tube was taken out of the bath and the polymer was removed by breaking the polymer tube.

(b) A copolyester containing polyethylene oxybenzoate units, poly ethylene terephthalate units and poly ethylene-3-(+)-methyl adipate copolymer (PET/MA) acid, and polyethylene terephthalate (6.0 mole %)-parahydroxy benzoate (4.0 mole %), T$_2$/60, (obtained from Eastman Kodak & Co.) which shows a thermotropic nematic mesophase.

3 gms. of PET/MA and 12 gms. of T-2/60 were placed in a polycondensation tube having an inlet and outlet for nitrogen. The polycondensation tube was then placed in a triethylene glycol vapor bath.

The mixture was heated in the continuous stream of nitrogen for 3½ hours, a vacuum (0.5 mm) was then applied for 1½ hour. Subsequently the polycondensation tube was taken from the bath and the polymer was removed by breaking the tube.

EXAMPLE X

A mixture of 10 gms. Polyethylene terephthalate/-Polyethylene oxybenzoate (40:60), T-2/60 (obtained from the Eastman Company) and 2 gms. of dimethyl ester of 3-(+)-methyl adipic acid were placed in a polycondensation tube having an inlet and outlet for nitrogen. The nitrogen flow was started, and the tube was placed above a vapor bath of triethylene glycol to heat it to 280° C. After 4 hrs. of heating, a vacuum of 0.5 mm. was applied and the heating continued for 1½ hrs.

The polycondensation tube was taken out of the bath and the polymer was obtained by breaking the polycondensation tube.

I claim:

1. A polymeric material which is capable of forming high modulus, biaxially orientable structures of a cholesteric mesophase, wherein said polymeric material comprises an optically active monomer which is condensation co-polymerized with at least one p-phenylene containing monomer which is itself capable of forming a polymer exhibiting a nematic mesophase, or which is capable of being copolymerized with a second monomer to form a nematic mesophase, or which is capable of being copolymerized with a racemic mixture of said optically active monomers to form a nematic mesophase herein the resulting copolymer is characterized by a degree of inflexibility sufficient to form a mesophase and wherein said optically active monomer is present in said polymer after copolymerization in an amount sufficient to impart optical activity to said polymer sufficient to form a cholesteric mesophase.

2. The polymer of claim 1 wherein said optically active monomer is at least a partially resolved D or L isomer of a racemic mixture.

3. The polymer of claim 2 wherein said optically active monomer is selected from the group consisting of an optically active amino acid, diacid and diamine.

4. The polymer of claim 1 wherein said polymer is produced by condensation copolymerization of a monomer selected from the group consisting of monomer selected from the group consisting of

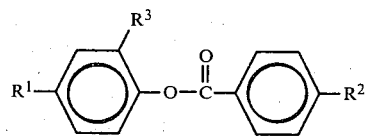

wherein $R^3$ = Cl, $CH_3$ or OH, stilbenes, such as stilbenes of the formula

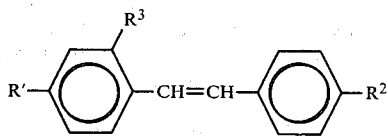

α-methyl stilbenes of the formula

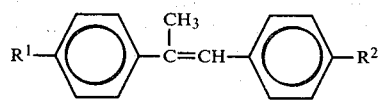

azomethines

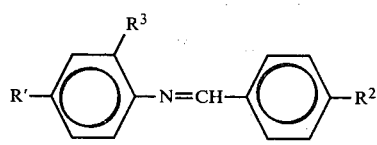

azo derivatives

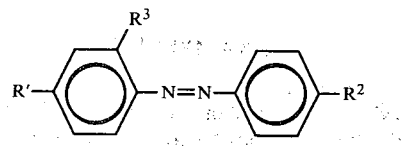

azoxy derivatives

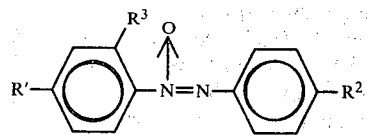

alkylene bridged diphenols

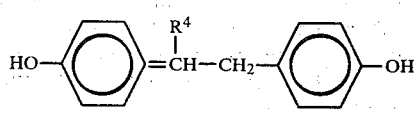

wherein $R^4$ = H or lower alkyl biphenyl compounds

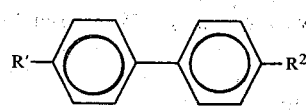

hydroquinones

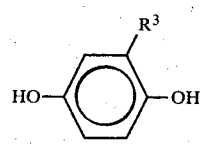

hydroquinone diacetate

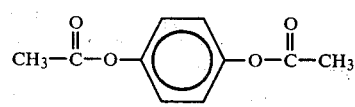

phenylene dicarboxylic acids or derivatives thereof

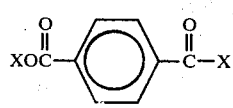

wherein X is —OH, —Cl, —Br or —O—⌬ or aminobenzoic acid

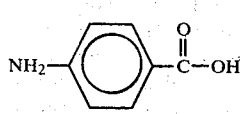

with an optically active monomer selected from the group consisting of an optically active amino acid, diacid and diamine.

5. A high modulus ultra high strength biaxially oriented film which is formed from the polymer of claim 1.

6. The high modulus biaxially oriented film of claim 5 wherein the modulus is from $1-5 \times 10^3$ lbs/in$^2$.

7. The polymer of claim 1, wherein said polymer selectively reflects circularly polarized light.

8. The polymer of claim 7, wherein the wavelength of said light is in the visible region.

9. The polymer of claim 8, wherein said polymer exhibits color in the absence of dye.

10. The film of claim 7, wherein said film selectively reflects circularly polarized light.

11. The film of claim 10, wherein the wavelength of said light is in the visible region.

12. The film of claim 11, wherein said film exhibits color in the absence of dye.

13. The polymer of claim 1 wherein at least one of the monomers capable of forming the nematic phase has the formula

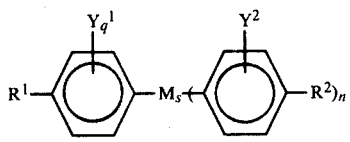

wherein $R^1$ and $R^2$ independently represent -COX$^1$, -NH$_2$, -OH,

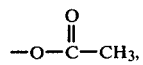

wherein X$^1$ is -OH, -Cl,

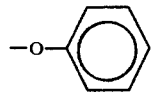

or -Br; n is 0 or 1, q is 1 or 3; wherein if n=0, M is any R' group which may be the same or different than the R' selection, and if n=1 then M is

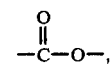

-CH=CH-, -C(CH$_3$)=CH-, -N=CH-, -N=N- or

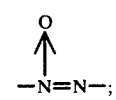

Y$^1$ and Y$^2$ are independently selected from the group of -H, -Cl, -Br, lower alkyl or -OH; and s may be 0 or 1.

14. The polymer of claim 13 wherein a second monomer selected from the group consisting of a diacid, a dialdehyde, a diacid halide, an amino acid, a diacetate, a diphenol, an aliphatic diol, a diamine and an amino alcohol is copolymerized with said p-phenylene containing monomer.

15. A three layered composite polymeric film, wherein each outer layer is a film as described in claim 5 having an absorption maximum $\lambda_0$ wherein the first outer layer has a helical pitch of opposite hand to the helical pitch of the second outer layer and the central layer is formed from polymeric molecules in a planar nematic state, said central layer having a thickness of $\lambda_0/2$, wherein said composite polymeric film selectively reflects incident light of wavelength $\lambda_0$ in the form of circularly polarized light.

16. The three layered composite polymeric film of claim 15, wherein $\lambda_0$ is in the visible wavelength region.

17. The three layered composite polymeric film of claim 16, wherein said composite polymeric film exhibits color in the absence of dye.

18. A method of manufacturing colored articles, comprising the step of manufacturing said article from a polymer as described in claim 9.

19. A method of coloring a manufactured article, comprising the step of attaching a polymer as described in claim 9 to a surface of said manufactured article.

20. A method of indicating temperature, comprising the step of contacting a polymer as described in claim 9 with a heat source.

* * * * *

UNITED STATES PATENT AND TRADEMARK OFFICE
CERTIFICATE OF CORRECTION

PATENT NO. : 4,412,059
DATED : October 25, 1983
INVENTOR(S) : William R. Krigbaum, Alberto Ciferri, Jack Preston It is certified that error appears in the above-identified patent and that said Letters Patent is hereby corrected as shown below:

Column 1, line 31, change "crystal" to --liquid crystal--.

Column 3, line 49, change "mesaphase" to --mesophase--;

line 54, change "twisted crystal" to --twisted liquid crystal--;

line 55, change "parallel to" to --perpendicular to--;

line 58, change "into" to --with--.

Column 4, line 5, change "cholesteric crystal" to --cholesteric liquid crystal--;

line 38, change "are" to --is--.

Column 7, line 41, change "factors on" to --factors in--;

line 42, change "listing is" to --listing are--.

Column 8, line 60, change "their high" to --its high--.

UNITED STATES PATENT AND TRADEMARK OFFICE
CERTIFICATE OF CORRECTION

PATENT NO. : 4,412,059

DATED : October 25, 1983

INVENTOR(S) : William R. Krigbaum, Alberto Ciferri, Jack Preston

Page 2 of 2

It is certified that error appears in the above-identified patent and that said Letters Patent is hereby corrected as shown below:

Column 9, line 5, change "from from" to --from--.

Column 10, line 51, change "directed during" to --during--.

Column 14, line 3, change "mesurement" to --measurement--.

Column 15, line 28, change "reflextivity" to --reflectivity--.

Column 17, line 28, change "otically" to --optically--.

Column 18, line 34, change "mixdture" to --mixture--.

Signed and Sealed this

First Day of May 1984

[SEAL]

Attest:

GERALD J. MOSSINGHOFF

Attesting Officer

Commissioner of Patents and Trademarks